US007552365B1

(12) United States Patent
Marsh et al.

(10) Patent No.: US 7,552,365 B1
(45) Date of Patent: Jun. 23, 2009

(54) WEB SITE SYSTEM WITH AUTOMATED PROCESSES FOR DETECTING FAILURE EVENTS AND FOR SELECTING FAILURE EVENTS FOR WHICH TO REQUEST USER FEEDBACK

(75) Inventors: Brian D. Marsh, Seattle, WA (US); Michael I. Hyman, Seattle, WA (US); Jeffrey P. Bezos, Greater Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 663 days.

(21) Appl. No.: 10/959,239

(22) Filed: Oct. 6, 2004

Related U.S. Application Data (63) Continuation-in-part of application No. 10/854,030, filed on May 26, 2004, now abandoned.

(51) Int. Cl.
*G06F 11/00* (2006.01)
(52) U.S. Cl. .................. 714/47; 707/5; 707/3; 715/701
(58) Field of Classification Search .................... 714/47; 707/3, 5; 715/701
See application file for complete search history.

(56) References Cited

U.S. PATENT DOCUMENTS

| | | | |
|---|---|---|---|
| 5,537,618 A * | 7/1996 | Boulton et al. ............... | 715/745 |
| 5,794,237 A * | 8/1998 | Gore, Jr. ......................... | 707/5 |
| 5,892,917 A | 4/1999 | Myerson | |
| 6,366,910 B1 | 4/2002 | Rajaraman et al. | |
| 6,915,234 B2 * | 7/2005 | Curtin et al. .................. | 702/182 |
| 7,117,207 B1 * | 10/2006 | Kerschberg et al. ............ | 707/5 |
| 7,140,025 B1 * | 11/2006 | Dillow et al. ................ | 719/313 |
| 7,216,121 B2 * | 5/2007 | Bachman et al. ................ | 707/3 |
| 7,219,148 B2 * | 5/2007 | Rounthwaite et al. ....... | 709/224 |
| 7,257,514 B2 * | 8/2007 | Faihe .......................... | 702/183 |
| 7,275,016 B2 * | 9/2007 | Gross et al. .................. | 702/182 |
| 7,409,593 B2 * | 8/2008 | Aaron .......................... | 714/26 |

(Continued)

FOREIGN PATENT DOCUMENTS

WO WO 01/27787 A1 4/2001

(Continued)

OTHER PUBLICATIONS

U.S. Appl. No. 10/612,395, filed Jul. 2, 2003 by Van Vleet, Fung, Ortega and Manber.

(Continued)

*Primary Examiner*—Scott T. Baderman
*Assistant Examiner*—Loan Truong
(74) *Attorney, Agent, or Firm*—Knobbe, Martens, Olson & Bear LLP (57) ABSTRACT

A web site or other interactive service maintains user activity data reflective of the activities of its users. A failure analysis component analyzes the user activity data to automatically detect likely failure events. A failure event filtering component intelligently selects failure events for which to request feedback from the user, preferably taking into consideration information about the failure event itself and information about the particular user. Requests for user feedback, and operator responses to the user feedback messages, are preferably presented on a personal log page that also displays other types of personalized information.

58 Claims, 5 Drawing Sheets

U.S. PATENT DOCUMENTS

| | | | |
|---|---|---|---|
| 2003/0135500 A1* | 7/2003 | Chevrel et al. | 707/9 |
| 2003/0154135 A1* | 8/2003 | Covington et al. | 705/26 |
| 2003/0167195 A1* | 9/2003 | Fernandes et al. | 705/8 |
| 2003/0172075 A1* | 9/2003 | Reisman | 707/10 |
| 2004/0068495 A1* | 4/2004 | Inaba et al. | 707/3 |
| 2004/0168117 A1* | 8/2004 | Renaud | 715/500.1 |
| 2005/0114199 A1* | 5/2005 | Hanif et al. | 705/10 |
| 2005/0125382 A1* | 6/2005 | Karnawat et al. | 707/3 |
| 2005/0125440 A1* | 6/2005 | Hirst | 707/103 R |
| 2006/0004891 A1* | 1/2006 | Hurst-Hiller et al. | 707/204 |
| 2006/0074709 A1* | 4/2006 | McAllister | 705/2 |
| 2007/0055694 A1* | 3/2007 | Ruge et al. | 707/104.1 |

FOREIGN PATENT DOCUMENTS

WO     WO 03/010621 A2     2/2003

OTHER PUBLICATIONS

U.S. Appl. No. 10/640,512, filed Aug. 13, 2003 by McQueen, Hyman and Brinkerhoff.

* cited by examiner

Give us feedback
Let us know why you haven't been able to buy a DVD Player. we'll have an advisor follow up with you and will try to figure out how to improve your shopping experience.

If you need help with an order, please contact Customer Service.

Please mark as many of the following boxes that apply:

☐ Price is too high.
☐ Model I want is not available.
    Enter model name:
☒ Model I want is not even listed.
    Enter model name: Toshiba Tivo Plus
☐ Nothing with the features I want.
    Enter feature description:

Tell us what it would take to enable you to buy this product:

It would be really nice to get more information about how to set up a Tivo. Given how popular the devices are, it would be a great

[Submit]

FIG. 5

WEB SITE SYSTEM WITH AUTOMATED PROCESSES FOR DETECTING FAILURE EVENTS AND FOR SELECTING FAILURE EVENTS FOR WHICH TO REQUEST USER FEEDBACK

PRIORITY CLAIM

This application is a continuation-in-part of U.S. application Ser. No. 10/854,030, filed May 26, 2004 now abandoned.

BACKGROUND OF THE INVENTION

1. Field of the Invention

The present invention relates to data processing methods for automatically detecting and handling likely failure events experienced by users of a web site or other interactive service.

2. Description of the Related Art

Web sites or other interactive services commonly provide mechanisms for users to provide feedback regarding problems they encounter. Typical problems that are reported include errors on the web site, such as pages that do not resolve or functionality that is broken. The operator of a web site may use such feedback to correct errors and make general improvements to the web site. In some cases, the operator may also provide personalized responses to the feedback messages received from users.

For complex web sites that support large numbers of users (e.g., millions of customers), this method of obtaining user feedback has significant limitations. For example, large numbers of users may provide feedback on the same type of problem, even though feedback from a small number of users may be sufficient to correct the problem. In addition, a significant portion of the feedback messages collected from users may provide suggestions that are of little or no value to the service provider. Thus, a heavy burden is often placed on those responsible for reviewing and responding to feedback messages, especially if an attempt is made to respond to each message.

In many cases, a user's inability to perform a particular task may be the result of an error on the part of the user. For example, in attempting to locate a particular item in an online catalog or directory, the user may search for the item in the wrong category or may inaccurately describe the item in a search query. This type of error is often unreported by the user and therefore goes unnoticed by the service provider. By failing to receive or review feedback on these types of problems, the web site or other interactive service operator provides a substandard experience to the user that may result in lost business.

SUMMARY OF THE INVENTION

The present invention provides a web site system, or other multi-user server system providing an interactive service, that monitors user activity data reflective of the activities of its users. A failure analysis component analyzes the user activity data on a user-by-user or aggregate basis, according to a set of rules, to automatically detect likely failure scenarios or events. The failure events preferably include patterns of user activity that, when viewed as a whole, indicate that a user or group of users has failed to achieve a desired objective or has had difficulty achieving a desired objective. For example, a failure event may be detected in which a user conducts multiple, related searches that are deemed to be unsuccessful (e.g., because no search results were returned or because no search result items were selected for viewing).

A failure event filtering component intelligently selects specific failure events for which to request feedback from a user or users regarding the failure event, preferably taking into consideration information about the failure event itself and information about the user. The decision of whether to request user feedback about the failure event preferably takes into consideration some or all of the following: (a) the type of failure event detected, (b) the transaction history of the user, (c) the frequency with which the user has previously responded to feedback requests, (d) the usefulness of any feedback previously provided by the user, as determined by a rating of previous user feedback messages, (e) the quantity of feedback already collected regarding this type of failure event, (f) the number of feedback messages currently queued for review and response, and (g) the quantity of resources currently available to respond to feedback messages from users.

Requests for user feedback, and responses to the user feedback messages, are preferably presented on a response page that may also display other types of personalized information. To respond to a feedback request, the user accesses and completes an online feedback form that corresponds to the type of failure detected. One feature of the invention is thus the use of a personal log to request feedback from users on specific failure events; this feature may be used regardless of how the failure events are detected, and regardless of whether feedback requests are sent to users selectively. Alternatively, feedback may be requested via email, an instant message, a pop-up window, or another communications method.

Neither this summary nor the following detailed description purports to define the invention. The invention is defined by the claims.

DETAILED DESCRIPTION OF A PREFERRED EMBODIMENT

A specific embodiment of the invention will now be described with reference to the drawings. This embodiment is intended to illustrate, and not limit, the present invention. The scope of the invention is defined by the claims.

Figure 1:
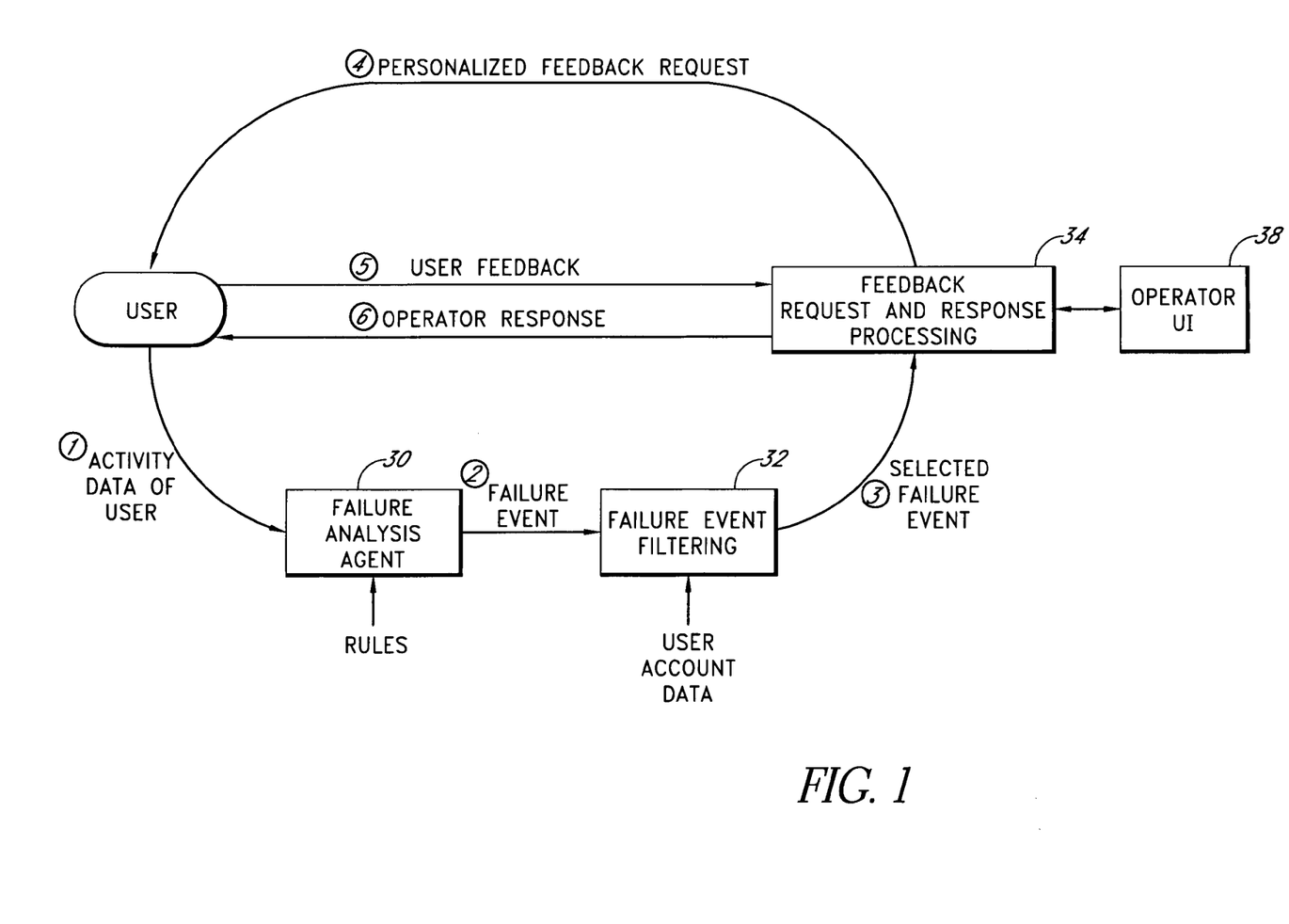
FIG. 1 illustrates the general process by which likely failure scenarios are detected, and by which user feedback regarding such failures is requested and processed, according to one embodiment of the invention.

FIG. 1 illustrates the general process by which likely failure scenarios are detected, and by which user feedback regarding such failures is requested and processed, according to one embodiment of the invention. As depicted generally by event 1, user activity data is collected as a user interacts with a web site or other type of interactive service. The activity data may, for example, include a clickstream history of the user, search query submissions of the user, impression data descriptive of items presented on dynamic web pages, and various other types of event data reflective of the user's actions. Each user action is preferably recorded in association with an ID of the user and a timestamp.

The user activity data collected over a period of time, such as over a single browsing session or a sequence of browsing sessions, is analyzed by a failure analysis agent 30. The failure analysis agent 30 applies a set of rules to the activity data to evaluate whether a failure event has occurred during the time period to which the activity data corresponds. These rules define the various types of failures that are detectable. Examples of types of failure events that may be detected include, for example, the following: (a) numerous re-submissions of the same or similar search queries over time; (b) multiple search query submissions that result in a null query result, (c) a likely spelling error in a search query, followed by termination by the user of the search process, (d) the user's failure to purchase items added to an online shopping cart, particularly if the user is new to the web site, and (e) the recurring display of an error message to the user. In some cases, the failure analysis agent 30 may also take into consideration the user's account information, such as the user's overall transaction history, when determining whether a failure event has occurred.

As indicated by the foregoing examples, the "failures" need not be technical in nature, but may include scenarios in which the user has potentially failed to accomplish an intended objective. In addition, at least some of the failures are detected by analyzing a pattern of activity (e.g., a sequence of page requests), as opposed to a single event. The types of failures that are detected by the failure analysis agent 30 will generally depend upon the purpose or function of the particular system (e.g., Internet search, product sales, financial transactions, etc.).

Figure 3:
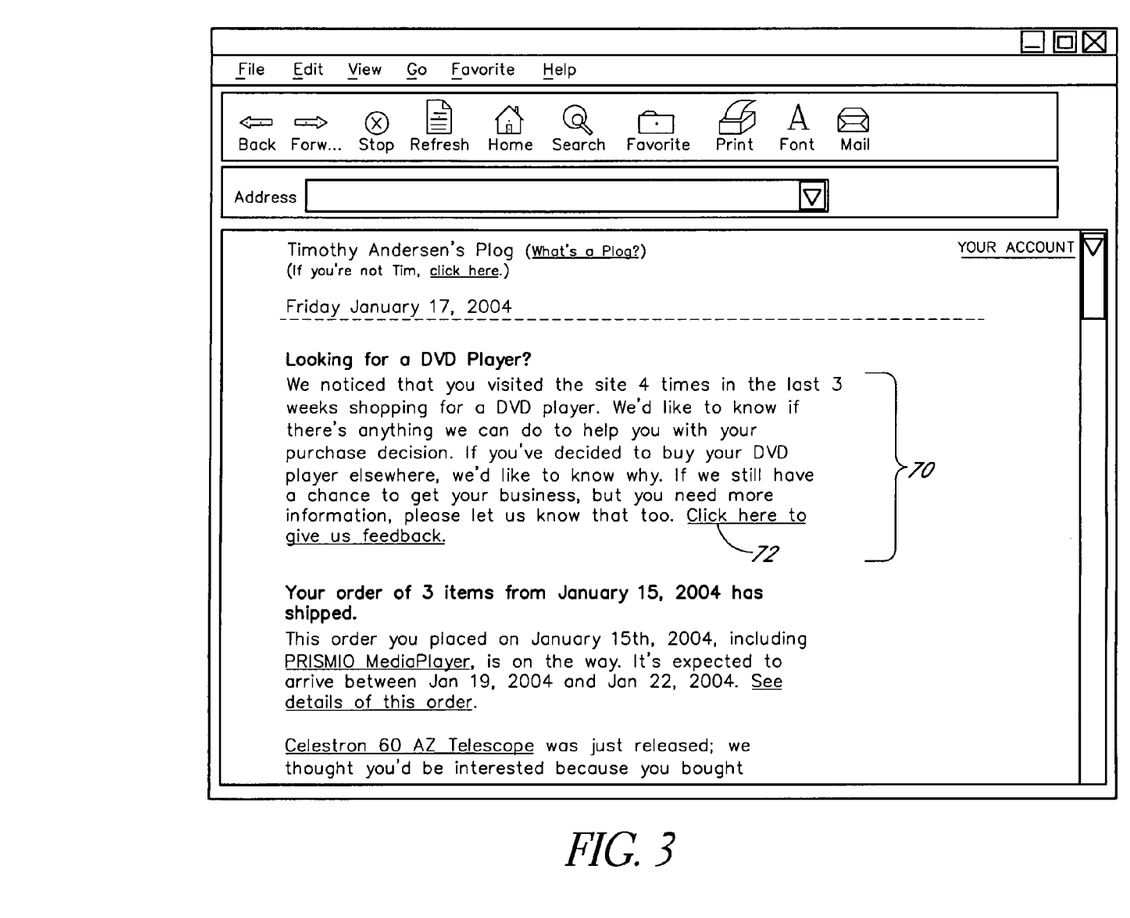
FIG. 3 illustrates an example of a personal log page with a feedback request message which includes a link to a feedback form.
Figure 4:
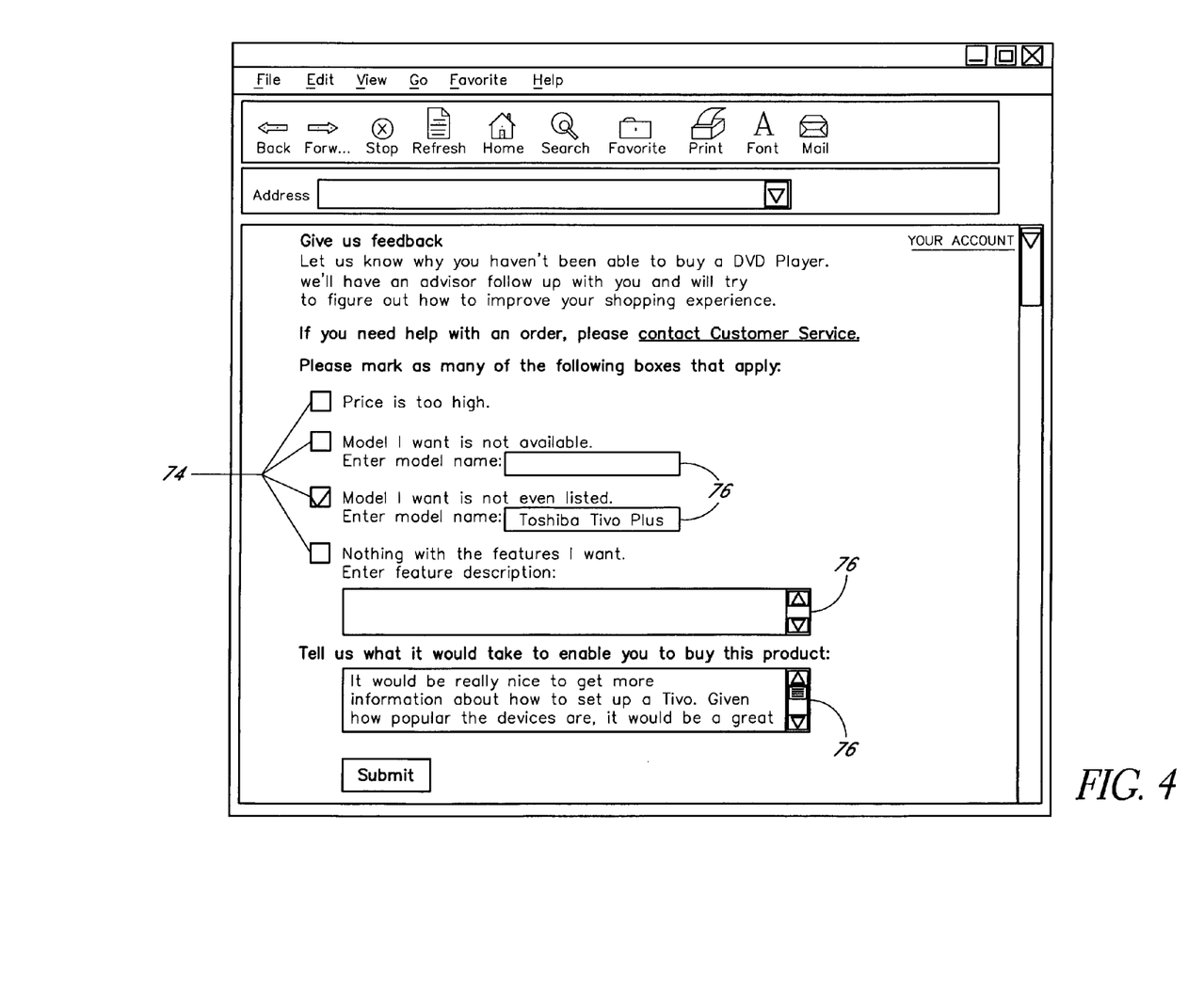
FIG. 4 illustrates an example feedback form that may be used to collect feedback regarding a detected failure event.

If the analysis agent 30 determines that a particular user action or pattern of actions represents a likely failure, the action or pattern of actions is treated as a failure event. As depicted by event 2 in FIG. 1, failure events detected by the failure analysis agent 30 are analyzed by a failure event filtering component 32 to evaluate whether feedback should be requested from the user. As discussed below, the decision of whether to request feedback may additionally be based on information about the user. If a decision is made to solicit feedback, the failure event is reported to a feedback request and processing component 34 (event 3), which is responsible for sending a feedback request to the user (event 4). An example of a feedback request that may be presented in the context of an online shopping web site is shown in FIG. 3, and an example of a corresponding feedback form is shown in FIG. 4 (both are discussed below). If the failure event is not selected for transmission of a feedback request, the failure event may be ignored.

The feedback request (FIG. 3) and the associated feedback form (FIG. 4) are preferably generated and transmitted to the user without any human intervention (i.e., the process of requesting feedback is fully automated). To provide a degree of personalization, the content of the feedback request and/or the feedback form may be selected by the system based on the type of the failure event and/or based on information about the user. In addition, specific details of the failure event, such as the time of occurrence or the associated search queries submitted by the user, may be included in the feedback request (as in FIG. 3).

In the example shown in FIG. 3, the feedback request message 70 includes a description of the detected failure, and includes a link 72 to a corresponding feedback form (web page). The feedback form (FIG. 4) includes checkboxes 74 that can be selected by the user to identify the type of problem encountered, and includes associated text fields 76 for providing related details. Different standard feedback forms, or feedback form templates, may be provided for different classes of failures, and/or for different areas or item categories of the web site. For example, different sets of checkboxes may be provided depending on whether, at the time of the failure, the user was searching or browsing for books, electronics, DVDs, web sites, or some other type of item. In some embodiments, a single, generic feedback form may be used for all feedback requests.

If the user responds to the feedback request (event 5 in FIG. 1), an operator may review the user's feedback, along with collected data about the failure event, via the operator UI 38. If appropriate, the operator then composes and sends a personalized response to the user (event 6) or selects a generic response that should be sent to the user. The task of reviewing and responding to the feedback messages from users may alternatively be automated, in-whole or in-part, by a software agent (not shown) that automatically creates a response to the user. The response may be based on a set of pre-generated or "canned" responses, or it may be based on a response that was previously created by an operator in response to a different user experiencing the same failure event. In either event, the pre-generated response may, for example, be provided to the user if a corresponding keyword, keyword phrase, or combination of keywords and/or keyword phrases appears in the user's feedback message.

Figure 5:
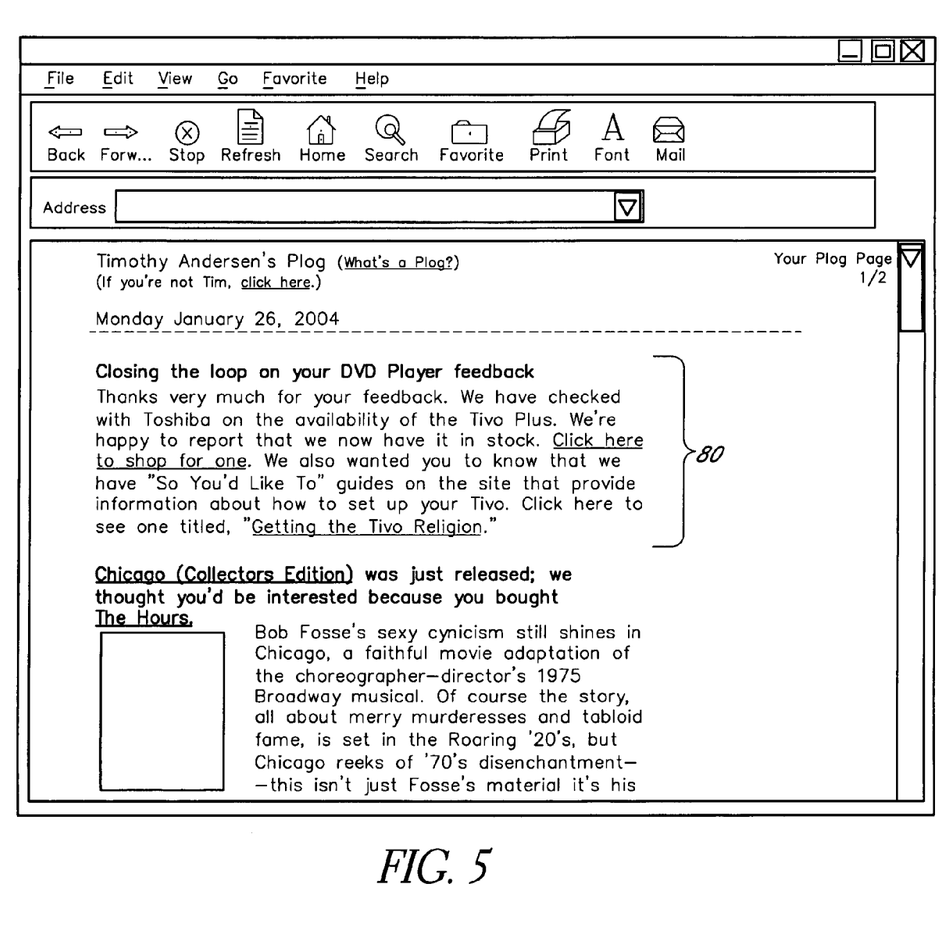
FIG. 5 illustrates an example personal log page which displays a feedback response message provided by an operator of the web site system.

The response sent to the user may take a variety of forms depending on the failure event experienced by the user. The response may, for example, provide suggestions to the user on how to overcome a particular type of problem. For example, the response may notify the user of a particular product that meets the characteristics specified by the user, or may assist the user in locating an item. An example of a type of response 80 that may be provided is shown in FIG. 5. In situations where the failure event is caused by a deficiency in the web site or interactive service, the response sent to the user may also advise the user that the condition causing the failure event at the web site or interactive service has been corrected. The user would then be encouraged to return to the web site or interactive service in order to complete their desired objective, and may be offered a financial or other incentive to do so. Prior to sending such a response, some type of corrective action would preferably have been taken to address the failure event identified by the user. For example, a completed feedback form received from the user may have caused the creation of a trouble ticket within a bug tracking system that leads to the condition causing the failure event to be fixed. In addition to sending a response, a usefulness grade may be assigned to the user's feedback, which may thereafter be considered by an algorithm that selects users from which to solicit feedback in the future.

As illustrated in FIGS. 3 and 5, the feedback requests 70 and responses 80 may be presented to the user on a personalized log or "plog" page. The plog page may also include selected content, such as blog entries authored by other users, as disclosed in U.S. patent application Ser. No. 10/640,512, filed Aug. 13, 2003, the disclosure of which is hereby incorporated by reference. The feedback requests 70 and/or responses 80 may alternatively be displayed on the web site's home page or an accounts page, or may be sent by email, an instant message, a pop-up window, or another communications method. Yet another approach is to place the requests and responses in a personal mailbox that is accessible from some or all pages of the web site.

Figure 2:
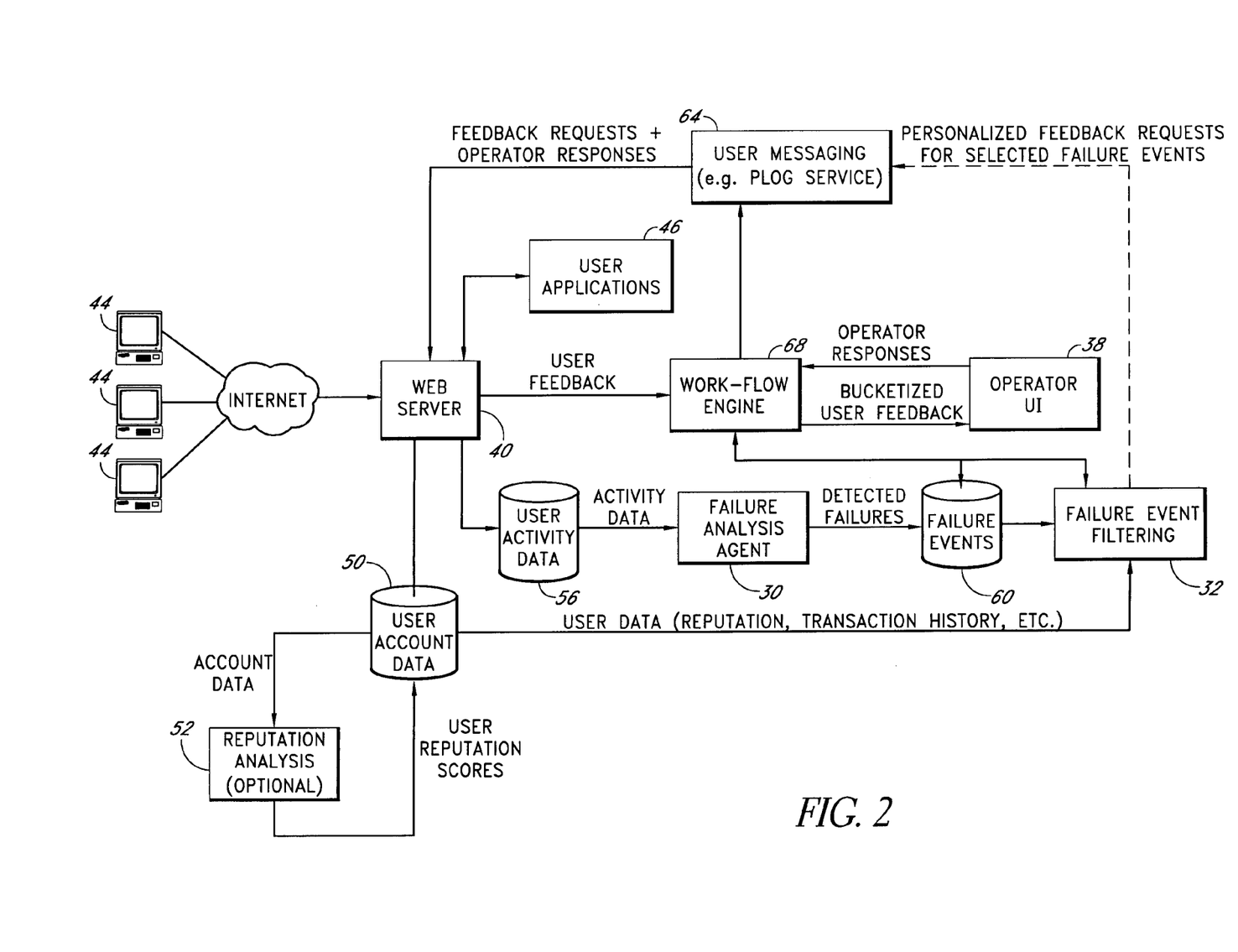
FIG. 2 illustrates an example web site architecture that may be used to implement the process of FIG. 1.

The filtering component 32 preferably takes into consideration a variety of different criteria in determining whether to request feedback from the user. Preferably, some or all of the following factors are taken into consideration:

- the frequency with which the particular type of failure event has been detected;
- the quantity of feedback that has been obtained from users on this particular type of failure;
- the transaction history of the user, such that valuable customers with significant transaction histories are more likely to receive feedback requests for a given failure event;
- whether the user has responded to previous feedback requests;
- whether the feedback provided by this user in the past has been helpful, as determined by a human operator or other system that reviews and rates user feedback messages;
- whether feedback has already been requested from this user for this particular type of failure;
- the frequency with which feedback has been requested from this user in the past, and the frequency with which the user has responded to such requests;
- the reputation of the particular user, as determined, for example, based on votes cast by others on postings of the particular user (as described below);
- the importance of the underlying transaction, if any, the user was attempting to perform at the time of the failure (as may be measured, e.g., by the dollar amount of the transaction);
- the number of user feedback messages that are currently queued for review;
- other indicia of the quantity and/or types of resources currently available to respond to the feedback messages.

All combinations of the foregoing criteria are included within the scope of this disclosure. Other criteria may additionally be taken into consideration.

The process of selecting specific failure events for which to solicit feedback serves three important goals. One goal is to obtain feedback about those problems that are the most likely to adversely affect the business or reputation of the web site. This goal is preferably achieved in part by taking into consideration the transaction history of the particular user, and/or the type of transaction that was being performed at the time of failure. For instance, the filtering algorithm may favor (tend to request feedback for) failure events of users with significant purchase histories, and failure events that occurred during attempts to conduct relatively high-priced transactions.

A second goal of the filtering process is to seek feedback from those who are the most likely to provide valuable feedback. This goal is preferably achieved in part by taking into consideration the quality of feedback previously provided by the user, the reputation of the user as determined from other sources of information, and/or the frequency with which the user has responded to feedback requests. The extent to which the user has used the web site system (e.g., frequent user versus occasional or new user), as reflected within the user's activity and transaction histories, may also be considered.

A third goal of the filtering process is to control the work load of the systems (either human or computer-implemented) that respond to the feedback requests, such that timely responses may be provided to all or substantially all of the users that provide feedback. This goal may be achieved by taking into consideration (a) the amount of feedback that has already been obtained on a particular type of problem, and/or (b) the number of user feedback messages that are currently queued for preparation of a response. To reduce redundant work by the same or different human operators, the failure events are preferably automatically sorted and "bucketized," so that an operator can easily identify failure events and user feedback that refer to the same type of problem or to the same area of the web site.

FIG. 2 illustrates a web site system that operates according to one embodiment of the invention. As will be recognized, the invention may also be embodied in other types of multi-user, interactive systems, such as online services networks and systems that use proprietary protocols. The system includes a web server 40 that serves web pages of a web site to user computing devices 44. The web server 40 interacts with a set of user applications 46, which may run on one or more application servers (not shown). The user applications 46 may vary in nature depending upon the nature of the web site. Typically, the user applications 46 will provide functionality for conducting various types of commerce-related transactions, such as purchasing items from an electronic catalog, purchasing items from other users, listing items for sale, and/or managing financial accounts. The invention, however, is not so limited. For example, the user applications 46 may include or consist of a search engine for searching the World Wide Web.

For purposes of illustration, it will be assumed throughout the following description that the user applications 46 provide user functionality for interacting with (such as by browsing and conducting searches within) an electronic catalog of items (such as physical products), and for purchasing items selected from the electronic catalog. In addition, it will be assumed that the applications 46 provide functionality for users to post product reviews and/or other types of content on the web site, and for other users to vote on or otherwise rate the quality of such postings. For example, in one embodiment, a user can post a product review on a detail page for a product, and visitors to the detail page can vote on whether the product review is helpful. As is known in the art, the votes or rating submissions collected through this process may be used to assign reputation levels to the authors of such content. These reputation levels may in turn be published on the web site, or otherwise used, to assist users in locating product reviews or other postings from reputable authors. The reputation levels of the users may additionally or alternatively be based on other criteria. For example, if the web site supports user-to-user sales, the reputation level of a seller may be dependent upon the number of sales made by the seller, the associated feedback from buyers, and/or other sales-related data associated with the seller.

As depicted in FIG. 2, the account data of each user of the system is maintained in a user accounts database 50. A user's account data may, for example, include information about the transactions (purchases, sales, etc.) conducted by the user, data regarding votes cast by other users on any postings of this user, and/or data regarding the usefulness of the feedback that has been provided by this user. As illustrated, a reputation analysis component 52 may periodically analyze the account data of a given user to evaluate the user's reputation. The user's reputation level may be represented by a score value or grade that is stored in association with the user. Examples of methods that may be used to calculate reputation levels of users are described in U.S. patent application Ser. No. 09/715,850, filed Nov. 17, 2000, the disclosure of which is incorporated herein by reference. In one embodiment, the reputation data is generated and maintained by a separate reputation service, which may be implemented as a web service. Rather than assigning reputation levels or grades to users, the task of filtering failure events may be performed in-whole or in-part using the raw account data of the user.

Data regarding the browsing activities of each user of the system is collected over time in a user activity database 56.

The user activity data may be stored in any of a variety of repository types, such as a server log file or "web log," a database of event data mined from a web log, or a history server that stores event data in real time in association with corresponding users. One example of a history server architecture that may be used to store user activity data is disclosed in U.S. patent application Ser. No. 10/612,395, filed Jul. 2, 2003, the disclosure of which is hereby incorporated by reference. Another possible approach is to collect the activity data on the associated user computers 44 using a special client-side software component, such as a browser plug-in.

The user activity data may, for example, include information about every selection event or "click" performed by each user, including information about dynamic page content served to the user. In some embodiments, the activity data may also include the HTML or other coding of some or all of the pages served to the user, such that an operator may view the actual sequence of web pages displayed to the user during the course of the failure event. A user's activity data may, in some embodiments, also reflect actions performed by the user on other web sites. For example, activity data may be collected from partner web sites, or may be obtained by having users install a browser "toolbar" plug-in that reports accesses to other web sites.

As illustrated in FIG. 2 and discussed above, the collected activity data is analyzed on a user-by-user basis by the failure analysis agent 30 to detect likely failure events. In other embodiments of the invention, the activity data of multiple users may be analyzed collectively by the failure analysis agent 30, such that a determination of whether a failure has occurred is dependent upon the actions of multiple users. As mentioned above, at least some of the failures are preferably detected by searching for specific patterns of user activity over a period of time (e.g., repeated unsuccessful search query submissions). The analysis of a user's activity data may be triggered by a particular type of event, such as the end of a browsing session in which no purchase transactions were completed. As part of the analysis, failure detection algorithms may be applied to the activity data collected for the user over a selected look-back horizon, such as one day, one week, one month, or the last N sessions. The failure detection algorithms may also be applied in real time as users access the web site, in which case a pop-up feedback request message may be presented to the user immediately upon detection of a failure event.

The detected failure events may be recorded within a failure events database 60. The data stored in this database 60 for a given failure event may include some or all of the following: the type of failure detected (e.g., "repetitive search queries that returned no search results"); the associated sequence of user actions or events, possibly including copies of the HTML pages actually viewed by the user; an ID of the user; an indication of whether a request for feedback has been sent to the user for the failure event; the feedback provided by the user, if any; and the current resolution status of the failure event, if applicable.

Table 1 illustrates one example of a code sequence that may be used by the failure analysis agent 30 to detect failure events. In this example, the searches conducted by each customer over the last 30 days are analyzed to detect likely failures by users to locate desired products. If, on more than one day, a given user has entered search terms that have located the same product or products in the catalog, the search results are generalized to identify the browse node(s) located by these searches. (Each product falls within at least one browse node in the preferred embodiment.) If the same browse node appears on at least two days, and the customer has not purchased anything within that browse node recently, a "missed search" failure event is generated using an object called CloseTheLoopMgr. This failure event may, for example, result in the generation of a feedback request that asks the user for information about what he or she was searching for within this particular browse node.

TABLE 1

CODE SEQUENCE FOR EXAMPLE FAILURE DETECTION RULE

```
foreach $c in customersVisitingLastMonth( ){
    foreach $s in customerSessionsLastMonth($c) {
        // Aggregate search results by days to detect a pattern
        foreach @t in searchTermsByDay($s) {
            push(@results, searchResults(@t));
        }
        // Find browse nodes that appear in more than one day
        @results = intersectBrowseNodes(@results);
        // Remove browse nodes in which purchases have been made
        @browseNodes = removePurchases(@results, $c);
        // Sort by the number of days a browse node appears
        @sortedBrowseNodes = sort(@browseNodes, "a.days <=>
        b.days");
        // If the node with the highest number of days has a day count
        <2, then
        // there is no pattern
        if ($sortedBrowseNodes[0].days <2){
            skip;
        }
        // Create a missed search pattern event
        $CloseTheLoopMgr->CreateEvent($c,
SearchMissEvent($sortedBrowseNodes[0].node,
$sortedBrowseNodes[0].days));
    }
}
```

Failure event data is read from the database 60 and processed by the filtering component 32, as described above. As each failure event is analyzed, the reputation level, transaction history, and/or other account data of the associated user may be retrieved and analyzed. The filtering algorithm may assign a score to each failure event, such that some or all of the above-mentioned factors influence the score. For example, a component score may be generated for each of the foregoing factors, and these component scores may be weighted and summed to generate the score for the failure event. The decision of whether to solicit feedback may then be made based on whether this score exceeds a particular threshold, which may be statically or dynamically set.

The weights applied or the factors considered may depend on the type of failure detected. For example, for an event in which an item has been left in a shopping cart for an extended period of time, a feedback request message may be sent only if the user has never completed a shopping cart transaction on the site. For search related failures, the user's purchase history may be accorded lesser weight. As mentioned above, one objective of the filtering process is to adaptively regulate the quantity of feedback requests sent to the user population as a whole such that the response systems can provide responses to all or substantially all users who provide feedback. Another objective is to reduce feedback regarding problems that are already known to the web site operator.

If a decision is made to request feedback from the user, a feedback request message is sent to a user messaging component 64 (FIG. 2), which may be a plog service that provides personalized log pages for users (see FIGS. 3 and 4). The personalized log pages may also display various other types of content, such as shipping notifications (as shown in FIG. 3), product releases related to the user's interests, and selected content authored by other users. Although illustrated by a direct path (dashed line) in FIG. 2, the feedback request may be generated and processed by a work-flow engine 68.

As depicted in FIG. 3 and discussed below, the feedback request preferably includes a link 72 for accessing a feedback form (FIG. 4). The feedback form may alternatively be included with the request itself. If the user completes and submits the feedback form, the feedback message is passed from the web server 40 to the workflow engine 68 for processing (FIG. 2), and is also recorded in the failure events database 60 in association with the corresponding failure event. The workflow engine 68 may group together related feedback messages for human processing based on the type of problem detected, similarity of feedback message (as detected by scanning the text of the feedback messages for specific keywords and keyword phrases), or other criteria. The workflow engine may also attempt to match the feedback message to an appropriate, predefined response message, which may be suggested to the operator.

The operator UI 38 (FIGS. 1 and 2) may provide various functions for sorting and grouping the feedback messages. For example, the operator UI may provide functions for sorting by author, category of catalog item involved (books, electronics, etc.), date of receipt, date of failure event, type of problem, and other criteria. This feature may be used to assign feedback messages to operators who are best qualified to respond.

When a given feedback message is selected by an operator for viewing, the operator UI 38 may also display the associated user activity data that gave rise to the failure event, and may display selected account information of the user. To respond to the feedback, the operator may type in a personalized message, and/or select from various boilerplate textual passages that are related to the reported problem. Operator responses to the feedback messages (and/or responses selected by an automated agent) are posted to the user messaging component 64 via the workflow engine 68, and may also be recorded in the failure events database 60.

The operator UI 38 may also include controls for the operator to grade or rate the usefulness of the user's feedback. As described above, these ratings may be recorded in association with the user for subsequent use. In addition, the operator UI 38 may provide access to various failure and feedback statistics generated by the workflow engine 68 or some other component. These statistics may reveal meaningful trends and problem areas that are helpful to the web site operator in improving the site. For example, in the context of the feedback form shown in FIG. 4, the statistics may reveal that a large number of users are interested in a particular product that is not currently in stock, or are unable to locate any products that have a particular attribute.

The various functional components shown in FIG. 2, including the failure analysis agent 30, the failure event filtering component 32, the operator UI 38, the web server 40, the applications 46, the reputation analysis component 52, the workflow engine 68, and the user messaging component 64, may be implemented within software that runs on one or more general purpose computers. Any two or more of these functional components may run on the same physical computer, and/or may be implemented within a single code module or application. Further, specific functions of a given component may be implemented in different software modules which may run on the same or different physical servers.

As will be apparent, some of these functional components, such as those responsible for detecting failure events and for selectively soliciting feedback, may be implemented as a web service, which need not be uniquely associated with any particular web site. The web service may, for example, receive and analyze the clickstream data associated with multiple, independent web sites to detect failure events. The web service could also handle such tasks as deciding whether to solicit feedback, sending feedback request messages to users, and processing the feedback messages from users.

Although this invention has been described in terms of certain preferred embodiments and applications, other embodiments and applications that are apparent to those of ordinary skill in the art, including embodiments which do not provide all of the features and advantages set forth herein, are also within the scope of this invention. Accordingly, the scope of the present invention is defined only by the appended claims.

What is claimed is:

1. A computer-implemented method of detecting and processing failure events associated with an interactive system, the method comprising:

monitoring activity of a user to generate user activity data reflective of events that occur during interaction with an interactive system;

programmatically analyzing the user activity data to detect a pattern of user activity indicative of a failure event; and programmatically evaluating, by execution of code by one or more computers, whether feedback should be requested from the user regarding the failure event such that a decision of whether to request feedback from the user takes into consideration information about the failure event, and further takes into consideration a current number of user feedback messages queued for review by at least one human operator for generating replies to the user feedback messages.

2. The method of claim 1, wherein programmatically analyzing the user activity data comprises analyzing a clickstream history of the user to assess whether the user has failed to achieve a desired objective.

3. The method of claim 1, wherein programmatically analyzing the user activity data comprises analyzing a search history of the user to assess whether the user has failed to locate desired information.

4. The method of claim 3, wherein the search history is analyzed to detect a pattern of related, unsuccessful search attempts.

5. The method of claim 1, wherein programmatically analyzing the user activity data comprises analyzing the contents of a user's shopping cart.

6. The method of claim 5, wherein the contents of the user's shopping cart are analyzed to determine if the user failed to purchase items added to the shopping cart.

7. The method of claim 1, wherein programmatically evaluating whether feedback should be requested comprises generating a score value that reflects the information about the failure event.

8. The method of claim 1, wherein the decision of whether to request feedback from the user additionally takes into consideration information about the user.

9. The method of claim 8, wherein programmatically evaluating whether feedback should be requested comprises generating a score value that reflects the information about the failure event and the information about the user.

10. The method of claim 8, wherein the information about the user comprises a transaction history of the user, said transaction history being separate from user activity data relied on to detect the failure event.

11. The method of claim 8, wherein the information about the user comprises data indicative of a usefulness of feedback previously provided by the user.

12. The method of claim 8, wherein the information about the user comprises reputation data derived at least in-part from votes cast by other users.

13. The method of claim 1, wherein the information about the user comprises data indicative of the frequency with which the user has previously responded to feedback requests.

14. The method of claim 1, wherein the information about the failure event comprises a type of the failure event.

15. The method of claim 1, wherein programmatically evaluating whether feedback should be requested from the user additionally comprises taking into consideration a current availability of resources for responding to feedback messages from users.

16. The method of claim 1, further comprising, in response to a decision to request feedback from the user, providing a feedback request message to the user that describes the failure event and requests feedback thereon, and providing at least one text field for the user to enter free-form feedback text.

17. The method of claim 16, wherein the feedback request message is a personalized web page presented to the user.

18. The method of claim 17, wherein the personalized web page is a personal log page.

19. The method of claim 16, wherein the feedback request message is an email, instant message, or a pop-up window.

20. The method of claim 16, further comprising, in response to receiving a feedback message from the user regarding the failure event, programmatically analyzing text of the feedback message to categorize the feedback message, said text entered by the user.

21. The method of claim 1, further comprising posting replies to particular user feedback messages for viewing by corresponding users.

22. The method of claim 21, wherein at least some of the replies are generated by a human operator.

23. The method of claim 21, wherein at least some of the replies are generated by an automated system.

24. A system for detecting and processing failure events associated with an interactive service, the system comprising:
   a data repository that stores user activity data reflective of events that occur during sessions of users with an interactive service;
   a failure analysis agent that analyzes at least the user activity data of the users to detect failure events;
   a failure event filtering component that evaluates whether a user that experienced a failure event of a particular type should be contacted to request feedback regarding the failure event, such that a decision whether to request feedback from the user on the failure event is based at least partly on a quantity of feedback data collected from users regarding said particular type of failure event;
   a user messaging component that requests feedback from users on selected failure events evaluated by the failure event filtering component; and
   one or more computers, wherein the failure analysis agent, failure event filtering component and user messaging component comprise software executed by said one or more computers.

25. The system of claim 24, wherein the failure analysis agent applies a set of rules to determine whether a pattern of events constitutes a failure event, at least some of the rules adapted to detect patterns of user activity indicative of a user failure to achieve a desired objective.

26. The system of claim 24, wherein the failure analysis agent detects failure events in which users are deemed to have conducted unsuccessful searches.

27. The system of claim 24, wherein the failure analysis agent detects failure events in which users have failed to purchase items added to a shopping cart.

28. The system of claim 24, wherein the failure event filtering component additionally takes into consideration a reputation level of the user in evaluating whether the user should be contacted to request feedback regarding the failure event.

29. The system of claim 24, wherein the failure event filtering component additionally takes into consideration, in evaluating whether the user should be contacted, a number of user feedback messages queued for review by at least one human operator for responding to the user feedback messages.

30. The system of claim 24, wherein the failure event filtering component additionally takes into consideration, in evaluating whether feedback should be requested from the user, a level of usefulness of feedback previously provided by the user.

31. The system of claim 24, wherein the failure event filtering component additionally takes into consideration, in evaluating whether feedback should be requested from the user, a transaction history of the user, said transaction history being separate from user activity data that gave rise to the failure event.

32. The system of claim 24, wherein the failure event filtering component additionally takes into consideration an availability of a resource for responding to feedback messages received from users, such that a quantity of feedback request messages sent to users is adjusted adaptively over time to regulate use of said resource.

33. The system of claim 32, wherein the resource is one or more human operators tasked with responding to feedback messages from users.

34. The system of claim 24, further comprising a component that automatically analyzes text of feedback messages received from the users to categorize the feedback messages, said text including free-form text entered by the users.

35. The system of claim 24, wherein the user messaging component presents feedback request messages to users within personalized logs of the users.

36. The system of claim 24, wherein the user messaging component presents feedback request messages to users within an email, instant message, or a pop-up window.

37. A method of detecting and processing web site failure events, the method comprising:
   monitoring activity of a user to generate user activity data reflective of events that occur during one or more interactive sessions of the user with the web site;
   programmatically analyzing the user activity data according to a set of rules to detect a failure event;
   generating a score that represents a desirability of contacting the user to request feedback about the failure event, wherein the score reflects information about the failure event and information about the user, and additionally reflects a quantity of user feedback messages queued for human review for generating replies to corresponding users;
   determining, based at least in part on the score, whether to request feedback from the user about the failure event; and
   if a decision is made to request feedback from the user, sending a request for feedback to the user;
   wherein the method is performed by a system that comprises one or more computers.

38. The method of claim 37, wherein the request for feedback is provided in conjunction with an electronic form that is adapted to be completed and submitted by the user to provide feedback regarding the failure event, said electronic form including at least one field for user entry of a free-form text message.

39. The method of claim 37, wherein the score reflects a usefulness of feedback previously provided by the user.

40. The method of claim 37, wherein the step of determining whether to request feedback comprises taking into consideration a frequency with which the user has previously responded to feedback requests.

41. The method of claim 37, wherein the score reflects a previously-derived reputation of a user.

42. The method of claim 37, wherein the score reflects a transaction history of the user, said transaction history being separate from user activity data relied on to detect the failure event.

43. The method of claim 37, wherein the failure event is an event in which the user conducts multiple unsuccessful searches.

44. The method of claim 43, wherein the failure event is detected at least in-part by detecting a search query submission for which no matching items were found.

45. The method of claim 37, wherein the failure event is an event in which the user has failed to purchase items that the user added to a shopping cart.

46. The method of claim 37, wherein the score reflects an availability of a resource for responding to feedback messages from users, whereby a quantity of feedback request messages sent to users is adjusted adaptively over time to regulate resource use.

47. The method of claim 46, wherein the resource is one or more human operators.

48. The method of claim 37, wherein the step of determining whether to request feedback is based in part on a quantity of user feedback collected regarding a type of the failure event.

49. A computer-implemented method of detecting and processing failure events associated with an interactive system, the method comprising:
  monitoring activity of a user to generate user activity data reflective of events that occur during interaction with an interactive system;
  programmatically analyzing the user activity data to detect a pattern of user activity indicative of a failure event of a particular type; and
  programmatically evaluating, via execution of instructions by a system that comprises one or more computers, whether feedback should be requested from the user regarding the failure event such that a decision of whether to request feedback from the user is based at least partly on how much feedback has been collected for said type of failure event.

50. The method of claim 49, wherein the decision of whether to request feedback from the user additionally takes into consideration a transaction history of the user, said transaction history being separate from user activity data relied on to detect the failure event.

51. The method of claim 49, wherein the decision of whether to request feedback from the user additionally takes into consideration data regarding a usefulness of feedback previously provided by the user.

52. The method of claim 49, wherein the decision of whether to request feedback from the user additionally takes into consideration reputation data reflective of a reputation of said user, said reputation data derived, at least in-part, from votes cast by other users.

53. The method of claim 49, wherein programmatically evaluating whether feedback should be requested from the user comprises taking into consideration a quantity of user feedback messages currently queued for review by at least one human operator for purposes of generating replies to the user feedback messages.

54. The method of claim 49, further comprising, in response to a decision to request feedback from the user, providing a feedback request message to the user that describes the failure event and requests feedback thereon, and providing the user access to a feedback form that includes at least one field for user entry of free-form feedback text.

55. A failure event detection and processing system, said system comprising:
  one or more computers programmed to detect and process failure events by at least:
    monitoring activity of a user to generate user activity data reflective of events that occur during interaction with an interactive system;
    analyzing the user activity data to detect a pattern of user activity indicative of a failure event of a particular type; and
    evaluating whether feedback should be requested from the user regarding the failure event such that a decision of whether to request feedback from the user is based at least partly on how much feedback has been collected for said type of failure event.

56. Physical computer storage having executable instructions stored thereon, said executable instructions capable of causing a computer system to perform a method that comprises:
  monitoring activity of a user to generate user activity data reflective of events that occur during interaction with an interactive system;
  programmatically analyzing the user activity data to detect a pattern of user activity indicative of a failure event of a particular type; and
  programmatically evaluating whether feedback should be requested from the user regarding the failure event such that a decision of whether to request feedback from the user is based at least partly on how much feedback has been collected for said type of failure event.

57. The method of claim 49, wherein the decision of whether to request feedback from the user is additionally based on an extent to which the user has previously responded to requests for feedback on detected failure events.

58. The system of claim 24, wherein the user messaging component additionally outputs feedback reply messages to users who submit feedback messages.

* * * * *